United States Patent
Lingrey et al.

(10) Patent No.: US 9,535,408 B2
(45) Date of Patent: Jan. 3, 2017

(54) CONTROL SYSTEM FOR A ROOM AIR CONDITIONER AND/OR HEAT PUMP

(75) Inventors: David J. Lingrey, San Antonio, TX (US); Kevin L. Eicher, Seguin, TX (US); George Cagle, San Antonio, TX (US)

(73) Assignee: Friedrich Air Conditioning Co., Ltd, San Antonio, TX (US)

( * ) Notice: Subject to any disclaimer, the term of this patent is extended or adjusted under 35 U.S.C. 154(b) by 1344 days.

(21) Appl. No.: 12/762,841

(22) Filed: Apr. 19, 2010

(65) Prior Publication Data

US 2011/0125328 A1 May 26, 2011

Related U.S. Application Data

(63) Continuation-in-part of application No. 29/350,863, filed on Nov. 24, 2009, now Pat. No. Des. 616,084, and a continuation-in-part of application No. 12/692,102, filed on Jan. 22, 2010, now Pat. No. 8,752,399, and a continuation-in-part of application No. 12/692,526, filed on Jan. 22, 2010, now Pat. No. 8,640,480.

(51) Int. Cl.
G05B 15/02 (2006.01)
G05B 23/02 (2006.01)

(52) U.S. Cl.
CPC ........... *G05B 15/02* (2013.01); *G05B 23/0256* (2013.01)

(58) Field of Classification Search
USPC .................................. 700/276, 278; 702/183
See application file for complete search history.

(56) References Cited

U.S. PATENT DOCUMENTS

| | | | |
|---|---|---|---|
| 3,636,724 A | 1/1972 | Moy | |
| 3,911,693 A | 10/1975 | Seigler et al. | |
| 3,965,692 A | 6/1976 | Amsted et al. | |
| 3,982,405 A | 9/1976 | Seigler et al. | |
| 3,990,261 A | 11/1976 | Smith | |
| 4,142,374 A | 3/1979 | Amsted et al. | |
| 4,176,525 A | 12/1979 | Tucker et al. | |
| 4,381,549 A * | 4/1983 | Stamp et al. | 62/126 |
| D284,305 S | 6/1986 | Lapychak et al. | |
| 4,633,770 A | 1/1987 | Taylor et al. | |
| 4,818,462 A | 4/1989 | Murano | |

(Continued)

OTHER PUBLICATIONS

Torres, Steven; "Interfacing an LCD to the MC9S08LC60", Freescale Semiconductor, Document No. AN3280 Rev 0 Jul. 2006 Publication on Archives Wayback Machine Mar. 7, 2007.*

*Primary Examiner* — Ryan Jarrett
(74) *Attorney, Agent, or Firm* — Gunn, Lee & Cave, P.C.

(57) ABSTRACT

A universal control system is provided for a room air conditioner or heat pump that has a number of sensor inputs. An electronic control system with a microcontroller and microcomputer are used to provide a large number of operations that can be performed by (1) manufacturer, (2) end users and (3) maintenance personnel. The manufacturer can load different versions of a software program to match the unit. The end user can program in a large number of different conditions or schedules the end user finds desirable, plus the end user is advised of maintenance requirements or faults. The maintenance personnel may perform diagnostics, determine fault history, upload improved or replacement software, as well as the numerous maintenance functions normally performed by maintenance personnel.

14 Claims, 14 Drawing Sheets

COOLING CYCLE

(56) References Cited

U.S. PATENT DOCUMENTS

| | | |
|---|---|---|
| D310,410 S | 9/1990 | Lapychak et al. |
| D310,411 S | 9/1990 | Lapychak et al. |
| D318,110 S | 7/1991 | Wollaber et al. |
| 5,140,830 A | 8/1992 | Sawyer |
| D337,816 S | 7/1993 | Hogan |
| D342,781 S | 12/1993 | Thompson et al. |
| D370,206 S | 5/1996 | Marino et al. |
| D372,463 S | 8/1996 | Zambelli et al. |
| D373,571 S | 9/1996 | Zambelli et al. |
| 5,622,058 A | 4/1997 | Ramakrishnan et al. |
| 5,634,346 A | 6/1997 | Ramakrishnan et al. |
| 5,732,565 A | 3/1998 | Ramakrishnan |
| 6,059,654 A | 5/2000 | Kim |
| 6,062,482 A * | 5/2000 | Gauthier et al. ............ 236/11 |
| 6,065,296 A | 5/2000 | Feger |
| 6,102,666 A | 8/2000 | Albrecht |
| D458,229 S | 6/2002 | Albrecht et al. |
| 6,631,319 B1 * | 10/2003 | Luh ............................. 701/54 |
| 6,741,915 B2 * | 5/2004 | Poth ........................... 700/276 |
| 6,742,349 B1 * | 6/2004 | Kawai et al. ................ 62/207 |
| 6,995,518 B2 * | 2/2006 | Havlik et al. ............ 315/169.3 |
| 7,003,378 B2 * | 2/2006 | Poth ........................... 700/276 |
| 7,765,818 B2 * | 8/2010 | Buck ............................ 62/180 |
| 2001/0048030 A1 * | 12/2001 | Sharood et al. ............ 236/49.3 |
| 2002/0052713 A1 * | 5/2002 | Abraham et al. ............ 702/183 |
| 2003/0116637 A1 * | 6/2003 | Ellingham ................... 237/2 B |
| 2004/0016241 A1 * | 1/2004 | Street et al. ................. 62/129 |
| 2004/0111239 A1 * | 6/2004 | Rossi et al. ................. 702/183 |
| 2005/0040249 A1 * | 2/2005 | Wacker et al. ............... 236/51 |
| 2005/0159847 A1 * | 7/2005 | Shah et al. .................. 700/276 |
| 2005/0234597 A1 * | 10/2005 | Harrod et al. ............... 700/276 |
| 2006/0230770 A1 * | 10/2006 | Kitsch .......................... 62/151 |
| 2008/0217419 A1 * | 9/2008 | Ehlers et al. .................. 236/44 |
| 2008/0223051 A1 * | 9/2008 | Kates ............................ 62/129 |
| 2010/0106329 A1 * | 4/2010 | Grohman ..................... 700/277 |
| 2010/0191487 A1 * | 7/2010 | Rada et al. .................... 702/60 |
| 2010/0274395 A1 * | 10/2010 | Durham, III ................. 700/276 |
| 2012/0324928 A1 * | 12/2012 | Durham et al. ............... 62/129 |

* cited by examiner

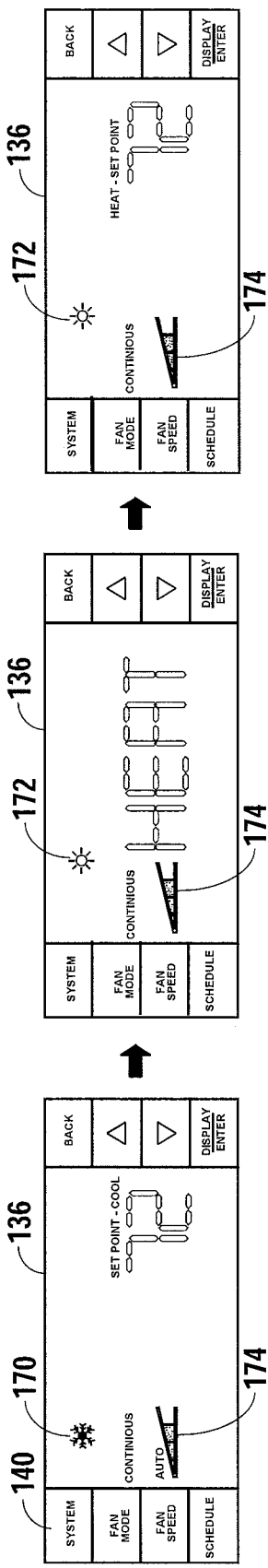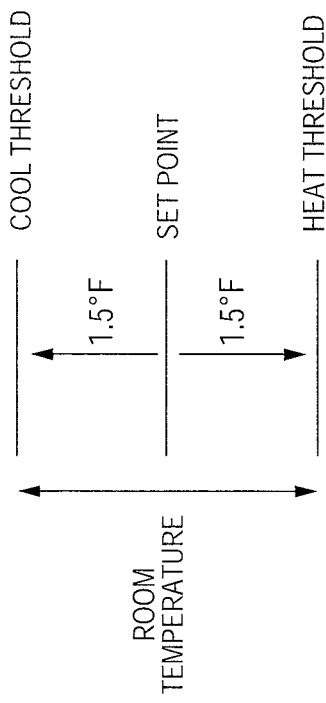
Fig. 7
Fig. 8

CONTROL SYSTEM FOR A ROOM AIR CONDITIONER AND/OR HEAT PUMP

CROSS-REFERENCE TO RELATED APPLICATIONS

The present invention is a continuation-in-part of U.S. Design patent application Ser. No. 29/350,863, filed on Nov. 24, 2009, a continuation-in-part of U.S. patent application Ser. No. 12/692,102, filed Jan. 22, 2010 and a continuation-in-part of U.S. patent application Ser. No. 12/692,526, filed Jan. 22, 2010.

BACKGROUND OF THE INVENTION

Field of the Invention

The present invention relates to control systems for a room air conditioner and/or heat pump and, more particularly, to a universal control system that can be used on any size room air conditioner and/or heat pump.

Description of Related Prior Art

Air conditioning can refer to any form of cooling, heating, ventilation, dehumidification, disinfection, or anything else that modifies the condition of air. Most people think of the terms "air conditioner" as referring to the cooling of air. Various forms of air conditioning have gone back as far as the second century in the Han Dynasty. British scientist and inventor Michael Faraday discovered that ammonia could be compressed into a liquid and allowed to evaporate to give a cooling effect. One of the earliest electric air conditioning units was invented by Willis Havilan Carrier, after whom the large heating/cooling company of Carrier Corporation is named.

Because ammonia was a toxic flammable gas, other products such as chlorofluorocarbon (CFC) were developed with a brand being marketed by DuPont Corporation becoming known as Freon. Over the years, different types of refrigerant have been developed with some refrigerants being designed particularly for heat-pump systems.

A heat-pump has the ability to bring heat into a room or to take heat out of a room. In the air conditioning cycle, the evaporator absorbs heat from inside the house and rejects the heat outside through a condenser. The condenser is located outside the space being cooled and an evaporator is located inside the space being cooled. The key component that makes a heat pump different from air conditioner is the reversing valve. The reversing valve allows for the flow direction of the refrigerant to be changed. This allows the heat to be pumped either into the space being conditioned or outside of the space being conditioned.

In the heating mode, the outdoor coil becomes the evaporator while the indoor coil becomes the condenser. The condenser dissipates the heat received from the refrigerant due to the air flowing there through and into the space to be heated. With the refrigerant flowing in the heating mode, the evaporator (outdoor coil) is absorbing the heat from the air and moving it inside. Once the refrigerant accepts heat, it is compressed and then sent to the condenser (indoor coil). The indoor coil then gives off the heat to the air moving there through which in turn heats the room being conditioned.

In the cooling mode, the outdoor coil is now the condenser and the indoor coil is the evaporator. The indoor coil will absorb heat from the air moving there through which cools the air being delivered to the room being conditioned. The condenser takes the heat from the refrigerant and transfers the heat to the outdoor air.

Heat pumps are normally used in more temperate climates. The reason for use in temperate climates is due to the problem of the outdoor coil forming ice which blocks airflow during the heating cycle. To compensate for icing during colder weather, a heat pump will have to temporarily switch back into the regular air conditioning mode to de-ice the outdoor coil. Rather than having cold air being discharged inside the space to be heated, a heating coil is switched on to heat the air being delivered through the inside coil to the space to be heated.

In the past, heat pumps were basically used in central air conditioning systems. A few of the more expensive window air conditioning units had the heat pump function. However, prior window mounted heat pumps had a number of drawbacks that are satisfied with the present invention.

In a window air conditioning unit or a through the wall system, normally everything is contained within the single unit. The exception might be the thermostat could be located at a remote location within the room to be heated or cooled. Otherwise the indoor coil, outdoor coil, compressor, reversing valve, motors, fans and expansion device are all contained within a unit. That unit which is powered by electricity, must have suitable controls for operation of the unit plus give good air distribution within the space to be heated or cooled.

Control systems for prior room air conditioners and/or heat pumps do not have the number of sensor inputs as the present invention, nor the number and/or type of functional controls as is provided by the present invention. By use of an electronic control system with a microprocessor in a user interface connected to a microcontroller for the main control, a large number of different control options can be programmed into the electronic control system. While in the past, a large number of different control options were available in central air conditioners, even the control system as used in central air conditioners are not as extensive as control options of the present invention.

Prior art known by Applicants does not have all the sensory inputs into an electronic control system that controls the air condition/heat pump functions in as many ways as the present invention.

In addition to the internal controls, the present electronic control system can (a) be connected to a remote control through an infrared detector, (b) a wall-mounted thermostat and/or (c) have a serial port that can be used for programming diagnostics or maintenance. The combination of these features are not shown in room air conditioners and/or heat pumps.

SUMMARY OF THE INVENTION

It is an object of the present invention to provide a control system for a room air conditioner and/or heat pump.

It is another object of the present invention to provide a user interface for convenience and ease of use by the end user, but also have a main control that controls operation of the air conditioner and/or heat pump as determined by various sensor inputs.

It is yet another object of the present invention to have a microcontroller within the main control for (a) control and processing algorithms, (b) setting a program schedule, (c) remote access, (d) diagnostics and protection, (e) fault protection, and (f) connection to a wall-mounted thermostat.

It is still another object of the present invention to have a user interface that has a display using twisted nematic field effect technology with white-on-black background for increased visibility.

It is another object of the present invention to have a control system for an air conditioner and heat pump that can automatically change from heating to cooling when necessary and with a user selectable seven-day/four periods per day time schedule.

It is even another object of the present invention to provide a control system for a room air conditioner and/or heat pump that has built in diagnostics with continuous monitoring to determine the condition of the unit and, if there is a problem, notify the user.

It is another object of the present invention to have a control system with a built-in maintenance menu system with a fault history recorder.

It is another object of the present invention to provide a serial port that can be used to program, monitor, diagnose or correct any errors in operation of the system. The serial port can also be used for program downloading or upgrades.

The control system for room air conditioners and/or heat pumps as shown in the present invention has many functions. The user interface, either alone or in combination with a remote control, can be used to set the operating parameters of the unit. The operating parameters can include setting a temperature with a permissible temperature swing of between 3°-10°. That temperature can be set for each day of the week with four different time periods of each day. Each day or time period can be varied as desired by the end user. The unit can switch automatically from heating to cooling and vice-versa, depending upon the settings made by the end user.

A reverse back lit display using twisted nematic field effect technology with a white on a black background visual display for the end user, which display can be increased or decreased in intensity as desired by the end user.

The programs as contained within the microcontroller of the main control can be used for control and processing algorithms, as well diagnostics and protection of the system. A built-in fault protection system is also included to provide warnings to the end user and, if necessary, to shut down the system. Remote access is also provided through a remote control.

Interface for a wall thermostat is also provided as well as intelligence to overlook certain miswiring conditions, but not others. A history of various fault conditions are maintained within the system so they can be reviewed as necessary for maintenance and/or repair. Also, prioritization of maintenance as required by the system is also indicated to the end user.

Variable fan speeds are provided that can be set automatically within the unit or by the end user. The variable fan speeds can be by either a set number of fan speeds (for example 4) or have an infinite number of fan speeds that use pulse width modulation. Different fan speeds may be desired based upon different operating conditions within the room air conditioner and/or heat pump. An auto fan can be used with different thresholds controlling fan speed. Temperature range over which no change occurs must be included to keep the fan from oscillating between different speeds when the temperature is on the borderline.

In the event that power is interrupted, or there is a brown-out condition so that power drops below a predetermined level, the air conditioner and/or heat pump will shut down. However, upon proper voltage being restored, the room air conditioner and/or heat pump will return to its last known condition as has been maintained in the microcontroller as to the last operating parameters to provide for an auto restart.

In the present control system, indoor temperature, outdoor temperature, time, percent relative humidity, and set points can be displayed to the end user. Variations around the set point can also be displayed for the convenience of the end user.

With the control system of the present invention, a universal software package can be prepared that is then customized at the time of manufacture for the particular air conditioner and/or heat pump in which it may be installed. The same software package can be used from the larger room air conditioner/heat pump to the smallest room air conditioner with the parameters of the type of unit being set in the software at the time of manufacturing. Later upgrades can be included in the software as desired. A wireless Internet transmitter/receiver can be included if desired by the manufacturer and/or end user.

The flash memory maintains the prior history of the unit in the event of power failure. Upon restoring power, the same operating conditions are automatically restored in the unit. Also, the operating history is stored from which maintenance personnel or the end user could download or use to determine fault conditions.

These and many other features are possible with the present invention for a new control system for a room air conditioner and/or heat pump, all of which will become more evident upon reviewing the specification indicated herein below in conjunction with the drawings.

BRIEF DESCRIPTION OF THE DRAWINGS

FIG. 7 is a sequential view of what the user would temporarily see on the display when switching from COOL to HEAT.

FIG. 8 is an illustration of how temperature can vary around a set point between heating or cooling thresholds.

DETAILED DESCRIPTION OF THE PREFERRED EMBODIMENT

Figure 1:
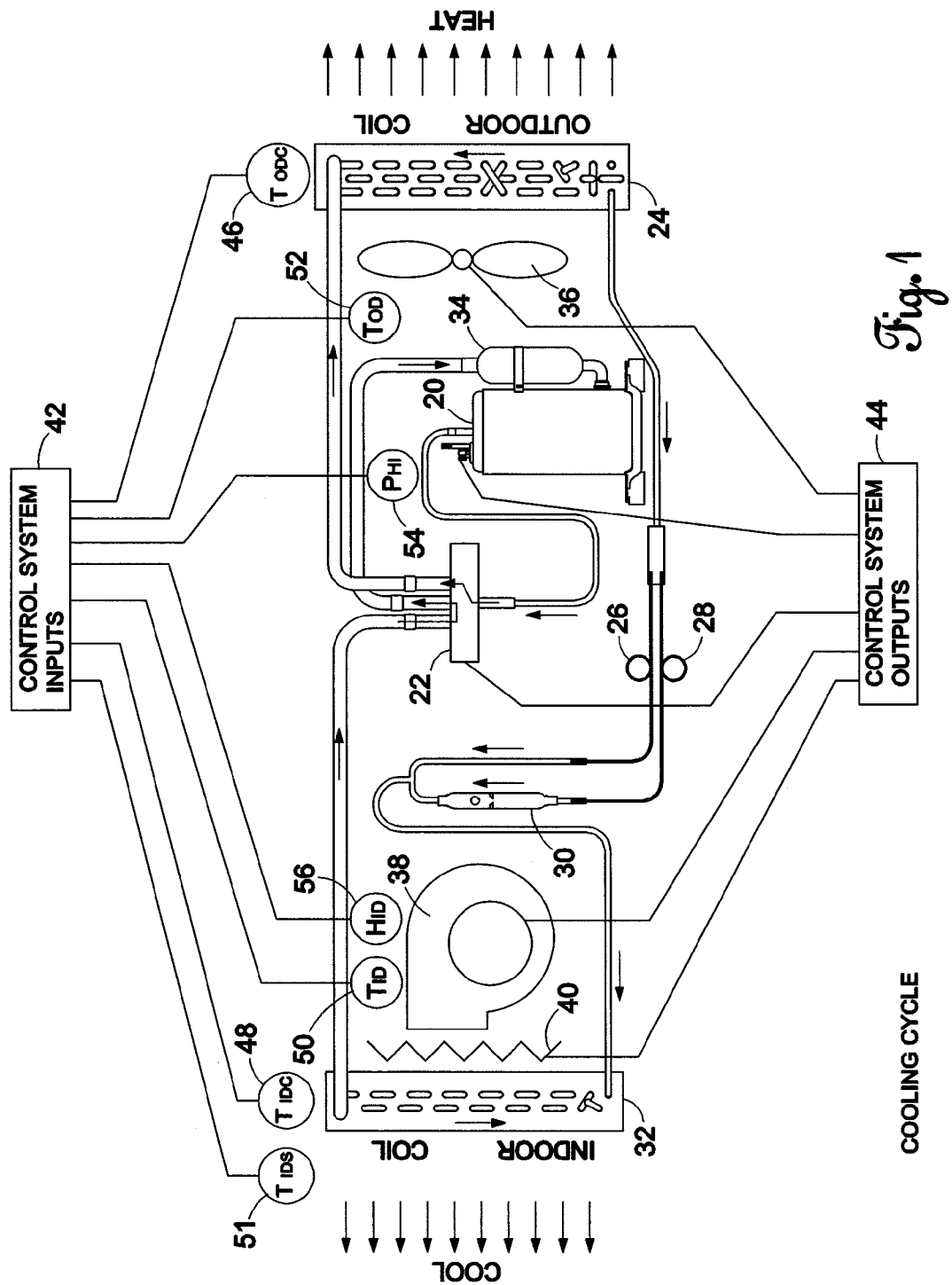
FIG. 1 is a schematic pictorial diagram of an air conditioner/heat pump made according to the present invention which is operating in a cooling mode.

A combination room air conditioner/heat pump is pictorially illustrated in FIG. 1. A refrigerant is compressed inside of compressor 20 and flows there from in the direction indicated by the arrows through reversing valve 22. The refrigerant changes from the vapor state to the liquid state in outdoor coil 24. The outdoor coil 24 is acting as a condenser and is giving off heat to the air flowing there through.

From the outdoor coil 24 the refrigerant flows through heating/cooling capillary tube 26 and cooling capillary tube 28. From the cooling capillary tube the refrigerant flows through check valve 30. Both streams of the refrigerant are combined together and allowed to expand inside of indoor coil 32. The indoor coil 32 is functioning as an evaporator and is therefore absorbing heat from the air flowing there through to give a cooling effect. Inside of the indoor coil 32 the refrigerant is changing from a liquid to a vapor state.

From the indoor coil 32 the refrigerant flows through the reversing valve 22 in the directions indicated by the arrows to the accumulator 34.

Simultaneously, a fan 36 forces air through the outdoor coil 24 and a blower 38 directs air through the indoor coil 32. While not used in the cooling cycle, a heater coil 40 is located in the path of airflow through the indoor coil 32.

The controls for the air conditioner illustrated in FIG. 1 are for simplicity purposes divided between control system inputs 42 and control system outputs 44. A temperature sensor 46 is located on the outdoor coil 24 and is referred to as $T_{ODC}$. Likewise a temperature sensor 48 is mounted on the indoor coil 32 and is used to measure the temperature thereof and is referred to as $T_{IDC}$. The temperature sensor 51 is measuring the air as it comes out of the indoor coil 32 and is referred to as the temperature of the indoor supply $T_{IDS}$.

Located in the airstream of air coming into the air conditioner from the room being cooled is a temperature sensor 50, which measures the indoor temperature and is referred to as $T_{ID}$. Temperature sensor 50 ($T_{ID}$) is what is used to set the desired indoor temperature. Temperature sensor 52 is located in the airstream of the outdoor air being brought into the air conditioner and measures outdoor air temperature and is referred to as $T_{OD}$.

On the discharge side of the compressor 20 is a pressure sensor 54 which measures the high pressure $P_{HI}$ of the refrigerant being discharged from the compressor 20. The pressure sensor 54 may be used to shut the system down if extreme pressure is generated or something is not functioning properly.

An indoor humidity sensor 56 is also located in the path of the air being brought into the air conditioner to measure relative humidity and is also referred to as $H_{ID}$.

While not shown in the pictorial diagram of FIG. 1, the voltage level of the incoming line voltage is also measured so that if the voltage gets too high or too low, operation of the air conditioner will stop until line voltage gets back into normal levels. For example, in brownout conditions the air conditioner would shut OFF.

Using the information collected from temperature sensors 46, 48, 50, 51 and 52, pressure sensor 54 and indoor humidity sensor 56, control system outputs 44 are generated. Control systems outputs 44 may control the speed of fan 36 and/or blower 38. The control of the speed may be ON, OFF, various set points, or may have an infinitely variable speed by using pulse width modulation. While the fan 36 and blower 38 may be driven by single motor, they may also be driven by separate motors which allows for independent variation of their respective speeds.

Also the control system output 44 controls the operation of the compressor 20, the reversing valve 22 and electric heater (heater coil 40). If extra heat is necessary during a heating cycle, heater coil 40 may be turned on as will be subsequently described.

Figure 2:
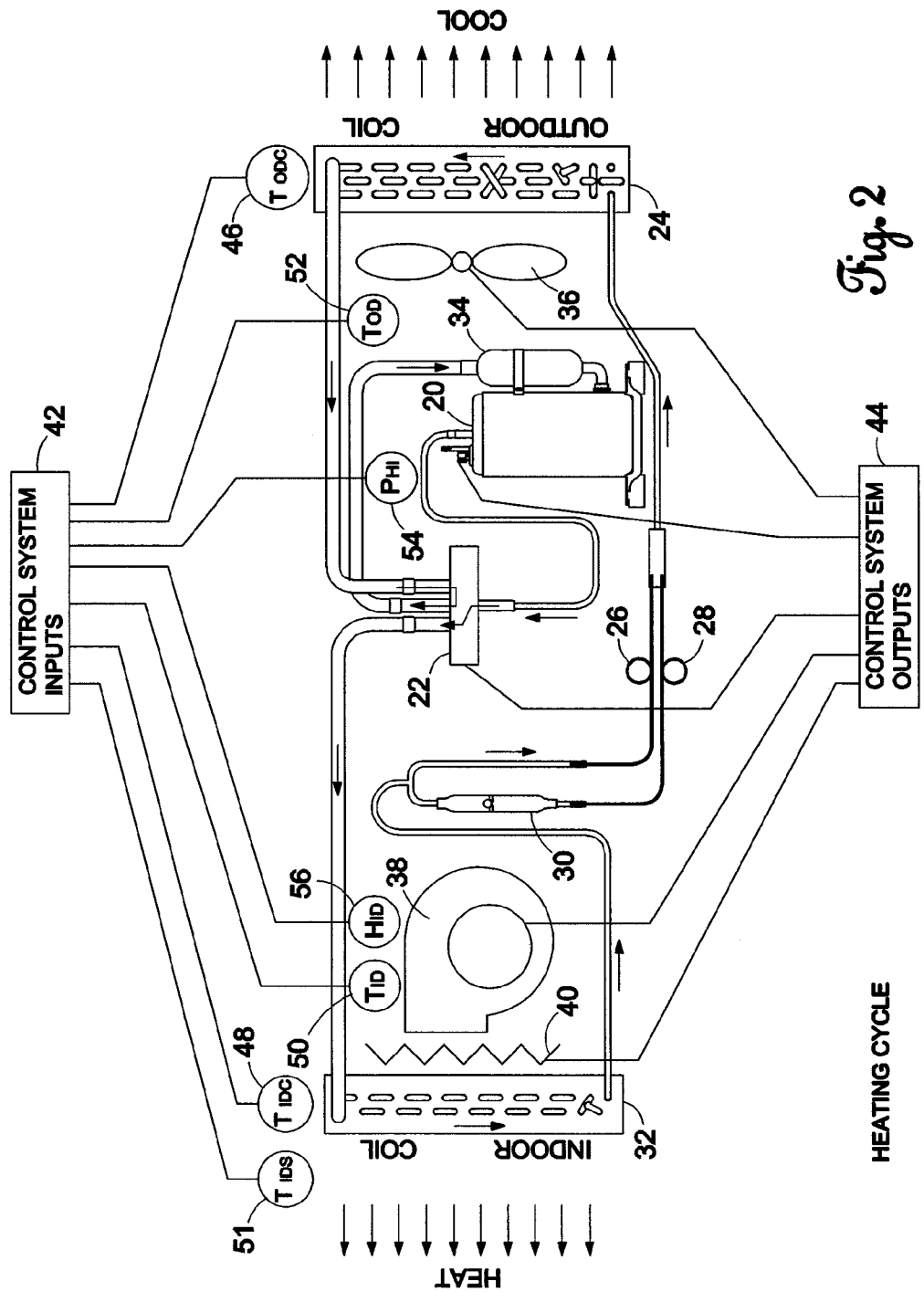
FIG. 2 is the same pictorial schematic diagram shown in FIG. 1, except that the air conditioner/heat pump is operating in a heating mode.

As soon as the air conditioner as shown in FIG. 1 is switched from a cooling mode to a heating mode, it now functions as a heat pump, which is illustrated in FIG. 2. The control system outputs 44 are used to switch the reversing valve 22 to change the direction of flow of the refrigerant there through. When operating in the heating mode, the compressed gas changes to a liquid in the indoor coil 32, which is now acting as a condenser. As a result the indoor coil 32 now gives off heat to the air flowing there across. The flow of the liquid refrigerant from the indoor coil 32 cannot flow through the check valve 30 which closes. Therefore, the refrigerant only flows through the cooling/heating capillary tube 26. The restricted flow allows the refrigerant which is in a liquid state to expand inside of outdoor coil 24, which is now operating as an evaporator.

The outdoor coil 24 absorbs heat from the air flowing there across, therefore discharging cool air to the outside. The vapor in the outdoor coil 24 flows through the reversing valve 22 into the accumulator 34 of the compressor 20. The refrigerant is then compressed again and the cycle repeated.

During the heating cycle in cold weather, sometimes the outdoor coil 24 will freeze up. During those occasions it may be necessary to reverse cycle the unit to remove ice from the outdoor coil 24. When that occurs, the heater 40 is turned ON so that warm air will continue to flow into the room being heated. The heater 40 may be two electrical coils 40a and 40b, also known as split coils, to give more control when heater 40 is turned ON. The speed of the fan 36 and the blower 38 may also be varied as is desired by the particular operation.

Figure 3:
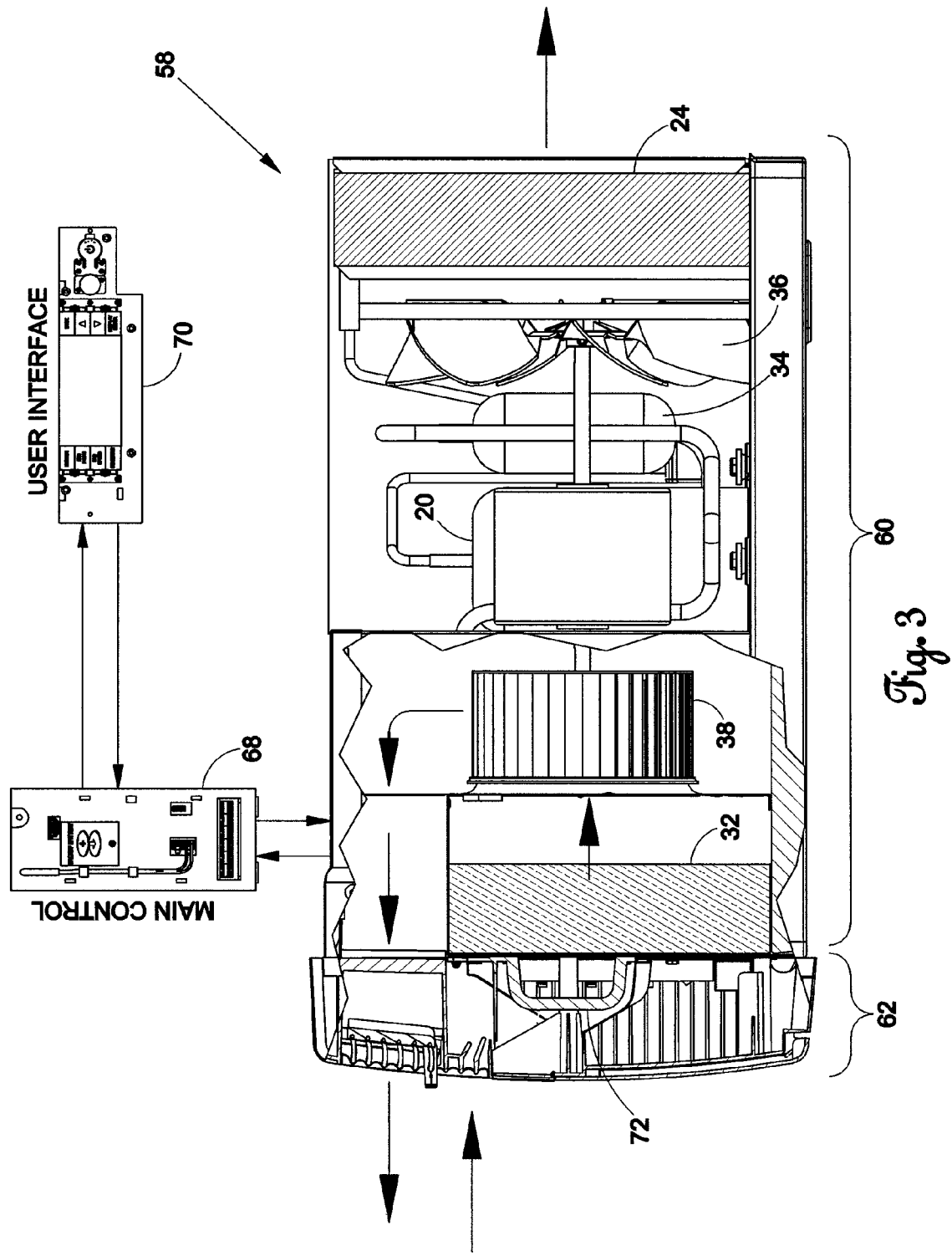
FIG. 3 is a side view of an air conditioner/heat pump with a partial cut-away to show internal components therein in an exploded view of the main control and user interface.

Referring now to FIG. 3, a typical air conditioner/heat pump 58 is shown with portions being broken away or exploded for illustration purposes. The air conditioning/heat pump unit 60 is illustrated by the portion within the bracket, which air conditioning/heat pump unit 60 has a bezel 62 on the front thereof. In the break away view of FIG. 3, internal components of the air conditioner/heat pump 58 can be seen, including the indoor coil 32 and outdoor coil 24 along with the fan 36 and blower 38. In the background the compressor 20 and accumulator 34 can also be seen. The arrows in the air conditioner/heat pump 58 illustrate the direction of movement of air there through.

Exploded from the air conditioner/heat pump 58 for display purposes is the main control 68 and the user interface 70. As will be explained in more detail subsequently, the main control 68 is located in the left hand side toward the front and the user interface 70 is located on the user interface mount 72.

Figure 4A:
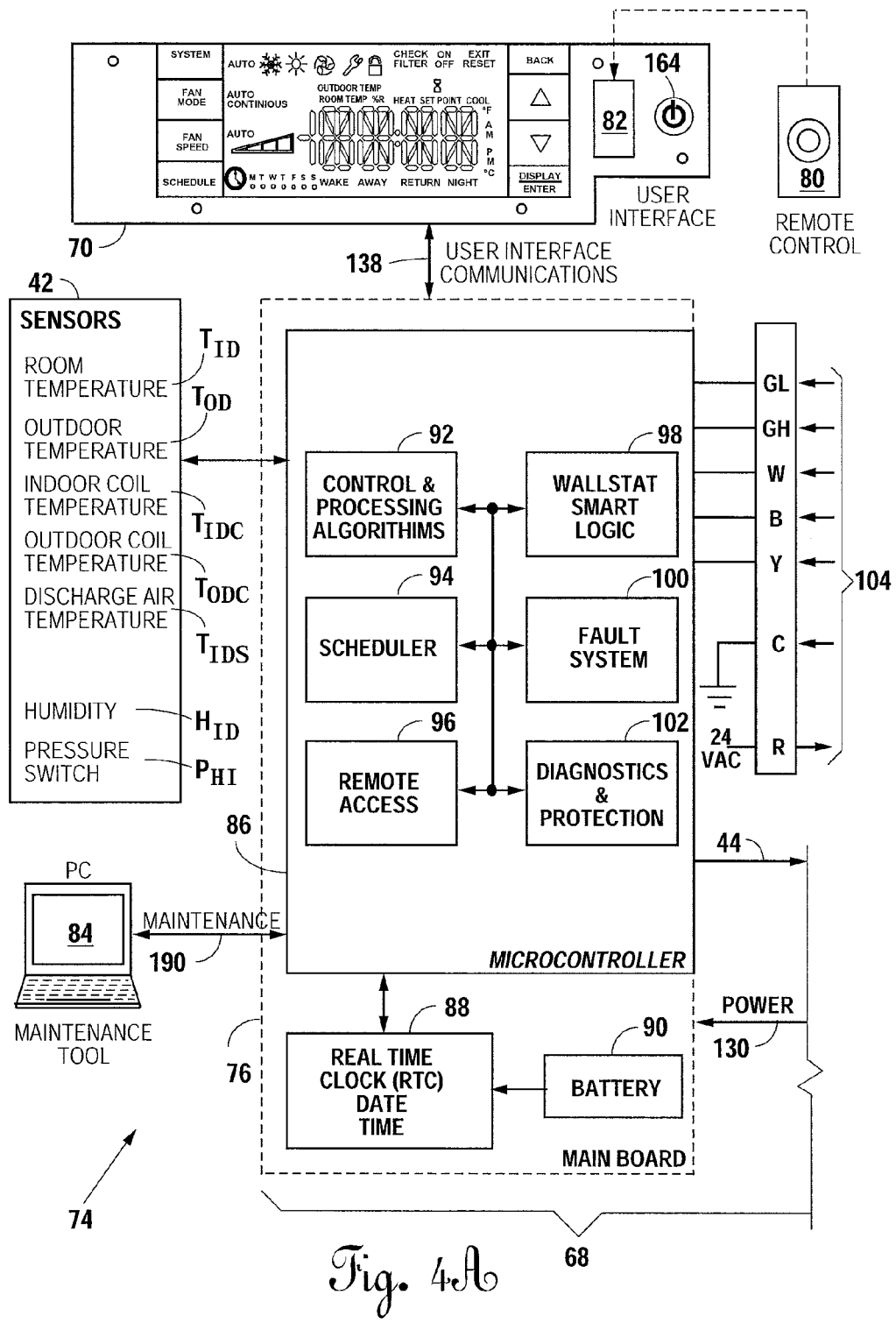
FIGS. 4A and 4B are pictorial schematic views of the electronic control system of the air conditioner and/or heat pump.
Figure 4B:
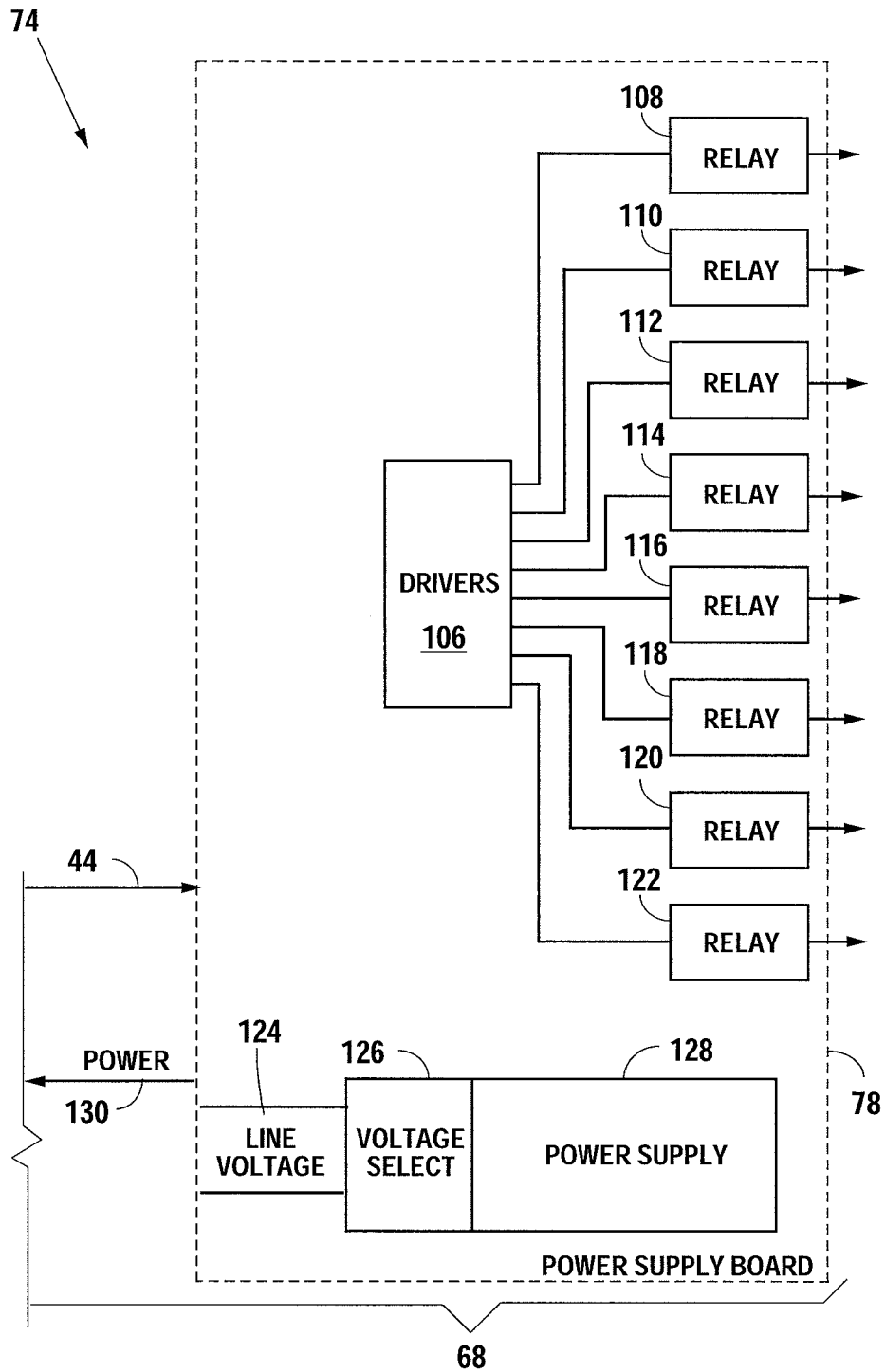

Referring now to FIGS. 4A and 4B in combination, the electronic control system is referred to generally by reference numeral 74. The electronic control system 74 has the user interface 70 and the main control 68 as previously described. The main control 68 is made up of a main board 76 and a power supply board 78. While the main board 76 and power supply board 78 may be constructed many different ways, one embodiment is to arrange them back-to-back in one physical unit referred to as the main control 68. Also, the control system inputs 42 feed into the main board 76.

A remote control 80 may be used to communicate with the user interface 70 through an infrared receiver 82 contained in the front thereof. The user has the option of making settings directly on the front of the user interface 70 or through remote control 80. Also, the main board 76 has a serial port 190 for connecting a personal computer 84 thereto. The personal computer 84 can be used to download a new program to the microcontroller 86 contained on the main board 76. The programming can be at the time of manufacturing the air conditioner/heat pump 58, or anytime thereafter. Also, the personal computer 84 can be used for diagnostics or maintenance work when desired. In normal operation, the personal computer 84 will probably not be connected to the microcontroller 86.

Within the main board 76 is a real time clock 88 that provides clock signals to the microcontroller 86. In case power is lost, the real time clock 88 has a back-up battery 90 to maintain the real time clock operation.

The microcontroller 86 is programmed to provide control and processing algorithms 92, scheduler 94, remote access 96, Wallstat Smart Logic 98, fault system 100 and diagnostics and protection 102, each of which will be described subsequently. Also, the main board 76 has a wall thermostat connection 104 in the event that a wall thermostat is used in conjunction with the electronic control system 74.

The power supply board 78 has drivers 106 connected to relays 108, 110, 112, 114, 116, 118, 120 or 122 as is determined by the control system outputs 44. The functions of the relays 108-122 are as follows:

| RELAY | FUNCTION |
| --- | --- |
| 108 | controls electric heat coil 40a |
| 110 | controls electric heat coil 40b |
| 112 | controls reversing valve 22 |
| 114 | controls compressor 20 |
| 116 | fan 36 speed 1 |
| 118 | fan 36 speed 2 |
| 120 | fan 36 speed 3 |
| 122 | fan 36 speed 4 |

Within the power supply board 78 is a line voltage connection 124. Since line voltage can vary, the line voltage 124 feeds in through a voltage select 126 before feeding into internal power supply 128. The internal power supply 128 converts the line voltage to the power needed for internal operation such as plus 5 volts, plus 12 volts, 12 volts AC or 24 volts AC, or any other internal voltages that are necessary in the electronic control system 74. Power from the internal power supply 128 in the power supply board 78 is provided to the main board 76 through power connection 130.

Figure 5:
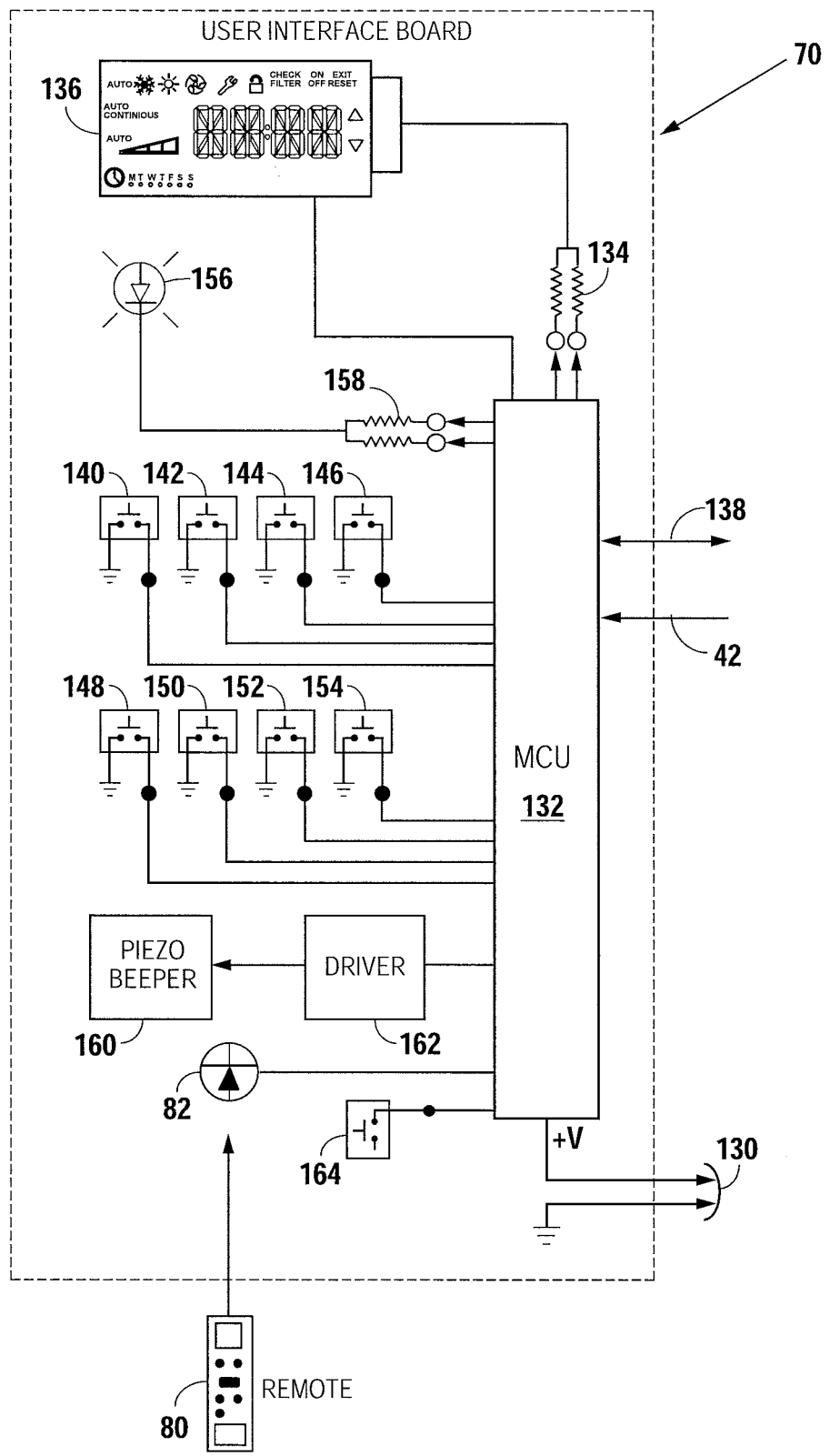
FIG. 5 is a pictorial schematic view of the user interface.

Referring now to FIG. 5, the user interface 70 will be described in more detail. Inside of the user interface 70 is a microcomputer 132 that connects through a power snubber 134 to a display 136 that is made using twisted nematic field effect technology. The microcomputer 132 also receives power from the power connection 130. Likewise, the microcomputer 132 exchanges information through information exchange connection 138 with the main board 76 (shown in FIG. 4).

Also feeding into the microcomputer 132 are the following inputs from contact switches with the input description of each contact switch being listed:

| CONTACT SWITCH NO. | INPUT DESCRIPTION |
| --- | --- |
| 140 | system operation |
| 142 | fan mode |
| 144 | fan speed |
| 146 | schedule |
| 148 | back |
| 150 | increase |
| 152 | decrease |
| 154 | Display/enter |

Contact switches 140, 142, 144, and 146 are on the left side of the display 136 and contact switches 148, 150, 152, and 154 are on the right side of the display 136 as is shown in FIG. 4A.

Power ON indicator 156 connects through current limiting resistors 158 to the driver which is controlled from the microcomputer 132. These resistors determine the optical intensity. In the event an audio warning is necessary, piezo beeper 160 connects through driver 162 to microcomputer 132 to provide audio warnings to the user when necessary.

Remote control 80 sends an infrared signal to the infrared receiver 82 which feeds the information to the microcomputer 132. Power is turned ON by pushing the power switch 164 to begin operation of the entire electronic control system 74 (shown in FIG. 4).

Figure 6:
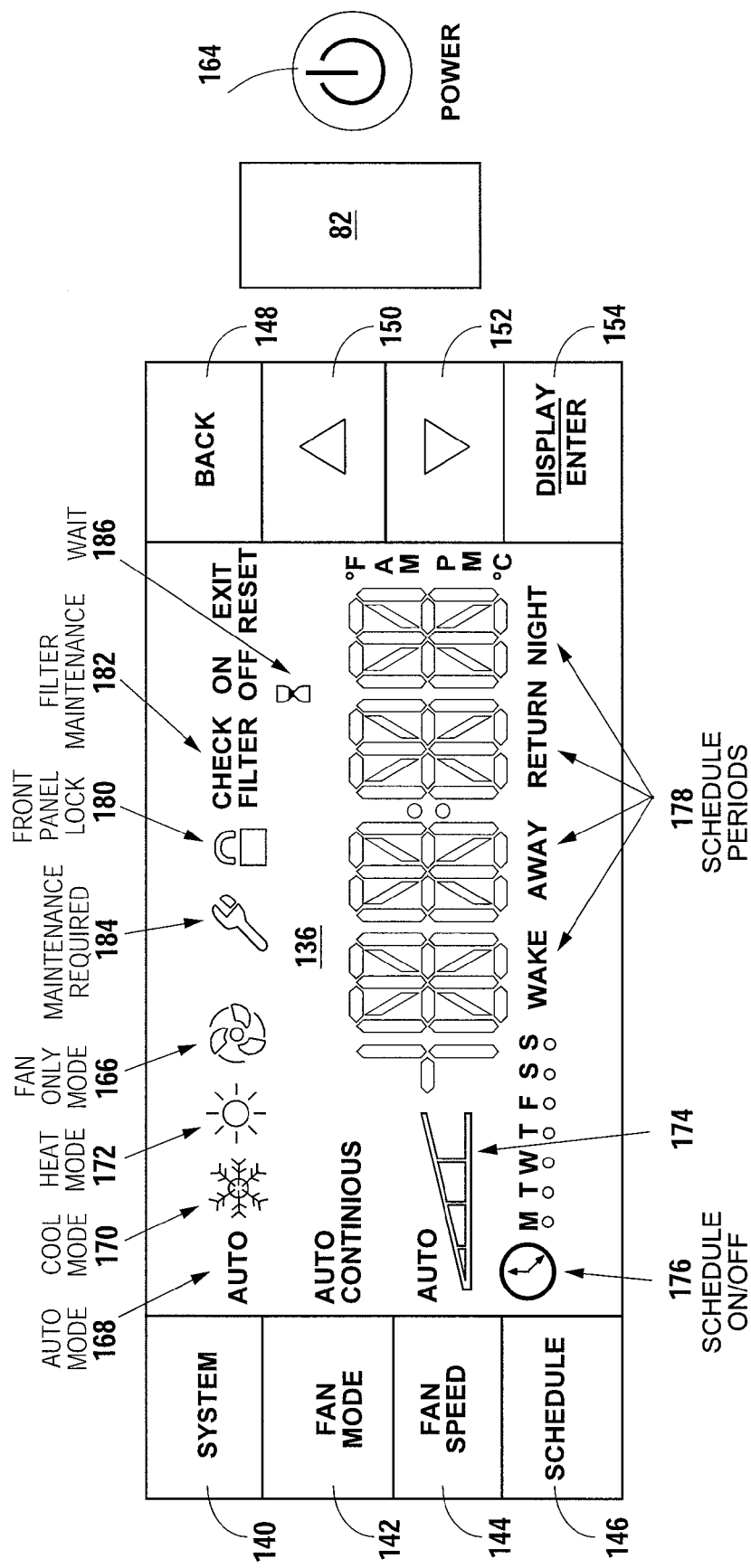
FIG. 6 is a pictorial view of what the user sees on the front of the user interface, except it will be white on a black background.

Referring now to FIG. 6, the user displays as contained on the user interface 70 are illustrated. The display 136 as seen by the user is surrounded by contact switches 140-154. The contact switches 140-154 have a black background with the information shown thereon being in white, although any other color pattern can be used. The power switch 164 is located on the right-hand side as is the custom in the industry.

The negative mode, twisted nematic field effect technology as is employed in the display 136 provides white information on a black background for greater display contrast.

Once the power switch 164 is pushed turning the air conditioner/heat pump 58ON (see FIG. 3), the operator may then set the conditions in the user interface 70. By pressing the contact switch 140, the system may be toggled through the AUTO, COOL, HEAT and FAN ONLY modes. When COOL or HEAT is called for, the display 136 will indicate the words "COOL" or "HEAT", respectively to provide greater viewing distance for the selection. After a short period of time, the words COOL or HEAT will time out and the set point temperature will be displayed.

Likewise, in the FAN ONLY or AUTO mode, the words "FAN" or "AUTO" will be temporarily displayed for a short period of time in the display 136. After the FAN ONLY mode has been selected and it is timed out to remove "FAN", the FAN ONLY icon 166 remains.

Likewise, if contact switch 140 for the system has been pressed to put the unit in its AUTO mode, the AUTO mode icon 168 will remain after it is timed out to remove the word "AUTO" from the display 136. If contact switch 140 selects the COOL mode, the COOL mode icon 170 will remain after it is timed out to remove the word "COOL" from the display 136. Similarly, the HEAT mode icon 172 will remain after the "HEAT" word has been removed from the display 136 because it has timed out.

Contact switch 142 for the fan mode switches the fan between AUTO or continuous with the appropriate display of "AUTO" or "CONTINUOUS" being displayed adjacent thereto in the display 136. The fan speed can be selected by contact switch 144 with the fan speed then being indicated by wedge-shaped icon 174.

The scheduler 94 in the microcontroller 86 (shown in FIG. 4) can be set by contact switch 146. When the scheduler is ON, the schedule icon 176 will so indicate. When contact switch 146 is first pressed, the schedule icon 176 will light up and the word "ON" will be displayed for a couple of seconds in the display 136 before returning to the displayed time. Active schedule operation is indicated by icon 146 (clock symbol) and the letters M T W T F S S, which stands for Monday, Tuesday, Wednesday, Thursday, Friday, Saturday, and Sunday, respectively. Assuming the day is Monday, a dot will appear below the M and the remaining dots under T W T F S S will not be shown. By pressing the contact switch 146 a second time, the display 136 will show "OFF" and the schedule icon 176 will disappear.

The schedule period 178 for "WAKE", "AWAY", "RETURN" or "NIGHT" may be set by holding the contact switch 146 for the schedule down for three seconds to enter a schedule setting mode. Thereafter, by toggling through contact 154 for Display/Enter, the user can set the "WAKE" temperature either in group of days, or for the individual days as preferred. For example, days Monday through Friday could be set for one temperature and the weekend days for another temperature during the WAKE hours. The WAKE hours can be adjusted up or down by contact switches 150 or 152, respectively. The contact switch 140 for "SYSTEM" would toggle through SYSTEM, FAN MODE, FAN SPEED, OFF and SKIP. Appropriate settings can be set for each of those items. Contact switch 154 for "DISPLAY/ENTER" can advance to the next option.

As an example, if the user had selected AUTO for the system mode, the display will show the heat set point temperature, then the cool set point. Each set point temperature may be changed UP or DOWN by pressing the UP contact switch 150 or DOWN contact switch 152. The system maintains a minimum of 3° between the high temperature and the low temperature to prevent short cycling in the AUTO mode.

If the user could select FAN ONLY, OFF or SKIP mode, the respective identifier (FAN, OFF, SKIP) will appear in the display. OFF turns the unit operation off during the selected period (WAKE, AWAY, RETURN or NIGHT), while SKIP causes the selected period to be skipped.

Each of the additional periods of WAKE, AWAY, RETURN or NIGHT is programmed the same identical way. Once the user has programmed all four periods, the program goes to the next day for each of the seven days to be programmed. This occurs until all of the days of the week have been programmed. When a user has completed setting start times and options, the user can press contact switch 146 for the schedule, hold it for three seconds, and the changes will be saved as the schedule. At the time of exiting the schedule, the display 136 will return to the operational mode before entering the schedule program mode.

Probably the simplest and the most typical adjustment the user will make to the air conditioner/heat pump 58 is by adjusting the set point temperature UP or DOWN. Assuming the set point temperature to be adjusted UP, contact switch 150 would be pressed and the temperature would advance one degree. On the display 136, the new temperature would be indicated with the words "SET POINT" being indicated there above, and whether the unit was on a HEAT or COOL mode. Likewise, the temperature may be adjusted DOWN by pressing contact switch 152, which will cause the set point temperature to be adjusted downward one degree with a new set point temperature being indicated in display 136 with the terms "SET POINT" indicated there above.

The next most common setting is when the user is setting the condition of COOL, HEAT, FAN, or AUTO, which can be done by toggling through the system with contact switch 140.

By pressing contact switch 142 for the fan mode, the user can change the fan mode from "CONTINUOUS" to "AUTO". By pressing contact switch 144 for fan speed, the user can set the fan speed as will be indicated by the wedge-shaped icon 174. The speed is increased or decreased by pushing fan speed switch 144. Depending upon the setting of the fan speed, the display 136 will indicate for a couple of seconds either LOW, MED, HIGH, MAX or AUTO, which represent the four different fan speeds plus automatic fan operation. Automatic fan operation changes the speed of the fan based on the temperature difference between the room ambient and the set point.

In case the user wants to lock the control panel, the user would press contact switch 146 for the schedule and contact switch 154 for the DISPLAY/ENTER, simultaneously, and hold for three seconds. This will cause the setting to be locked and for the front panel lock icon 180 to be displayed. The system can only be unlocked by again simultaneously pressing contact switch 146 for the schedule and contact switch 154 for the DISPLAY/ENTER, simultaneously, and holding them for three seconds.

In the electronic control system 74, there are some alerts that are automatically indicated on the display 136. For example, when a filter needs to be changed in the air conditioner/heat pump 58, filter maintenance 182 will be indicated the words "CHECK FILTER" appearing along with the word "RESET" on the upper right portion of the display 136. By depressing contact switch 148 labeled "BACK" this can be reset. However, when maintenance is required on the air conditioner/heat pump 58, the maintenance required icon 184 will appear. The maintenance required icon 184 will not disappear until the maintenance has been performed.

There may also be occasions when the compressor 20 must wait to run. There is a minimum wait time (a.k.a. lockout time) between successive compressor operations. In those occasions, a wait icon 186 will appear on the display 136.

There are many different user options that may be turned on or off via the user interface 70. By pressing contact switch 154 for DISPLAY/ENTER, user menu selections can be made for each of the following:

1. TIME: Set time;
2. 12/24 Switching time from a twelve-hour day to a twenty-four-hour day;
3. To "BEEP" at a particular time;
4. To "DIM" to change the dim operation;
5. EMHT to indicate emergency heat is being provided;
6. BAND: The range for the temperature swing can be adjusted anywhere between 3° to 10°;
7. ° F. ° C.: The selection between degrees Fahrenheit and degrees Centigrade is displayed;

8. FRZ: If a freeze occurs, end user by using this feature may enable to disable the warning by eliminated "FRZ" on the display 136;

9. TO: Ambient temperature offset (+/−8° F.);

10. ATSF: Switches the comfort setting on/off;

11. VER: Displays the software version.

To set the time, contact switch 154 for the DISPLAY/ENTER is pressed until "TIME" appears on display 136. Press switch 154 again. In much the same way one would set a digital watch, the time can then be set by either the UP contact switch 150 or the DOWN contact switch 152. The contact switch 154 for the DISPLAY/ENTER will switch between minutes, hours and days of the week. Contact switch 148 for "BACK" will return to the time display.

If a wall thermostat is used in connection with the electronic control system 74, then the display 136 will simply indicate COOL, HEAT, or FAN with the individual settings to be in the wall thermostat if the option is selected. However, the display 136 would still indicate if maintenance needs to be performed. To enter the maintenance mode, the user presses and holds for 5-10 seconds (a) contact switch 140 for the system, (b) contact switch 146 for the schedule, (c) contact switch 148 for BACK, and (d) contact switch 154 for DISPLAY/ENTER. Thereafter the user could toggle through the different maintenance menus. After selecting a particular maintenance menu, press contact switch 154 again to enter the menu.

Giving a typical example as to how the user interface 72 would work, a sequential view is shown in FIG. 7. Assuming the electronic control system 74 is on COOL with the set point being 72° Fahrenheit. and the fan is on automatic and operating at high speed, the condition of the display 136 is as indicated in FIG. 7A. If the user decides to switch to HEAT by pressing contact switch 140 for the system, the display 136 will change as shown in FIG. 7B. The cool mode icon 170 will go OFF and the heat mode icon 172 will come ON. The "AUTO" above the wedge-shaped icon 174 indicating fan speed will also go OFF. The word "HEAT" will be displayed for a few seconds in the display 136 before changing to the set point temperature with the word "HEAT" in small letters in front thereof. Previously, the words "SET POINT" were followed by "COOL" in small letters while in the cooling mode. The final display after a short timing sequence is shown in FIG. 7C.

The electronic control system 74 of an AUTO function is previously described. When in the AUTO function with a set point temperature, the range of temperature variations can be set to fluctuate anywhere between 3° and 10° F. Assuming the room temperature is set to fluctuate only 3° F., then the room temperature can fluctuate above and below the set point by ±1.5° F. as is illustrated in FIG. 8. If the temperature inside a room rises 1.5° F. or more above the set point, the cool threshold is reached and cooling will be provided to the room by switching into the cooling mode. On the other hand, if the room temperature decreases below the set point by 1.5° or more, the heat threshold is reached and the air conditioner/heat pump 58 will be switched to the heating mode. If the system, through contact switch 140, is set at AUTO mode, all of this will occur automatically.

Also, the electronic control system 74 allows the fan to adjust speed automatically if the fan mode represented by contact switch 142 is disabled (see FIG. 6). By having the fan set as automatic, a 4-speed fan can automatically adjust UP and DOWN based upon the temperature difference between the set point and the actual room temperature. The temperature variation 188 is plotted in FIG. 9 around the set temperature and the actual room temperature. Once the threshold differential (typically 1.5° F.) is exceeded, fan 1 is energized. Assuming the temperature continues to rise, once a second temperature differential (typically 3° F.) is exceed, fan 1 turns OFF and fan 2 turns ON.

Figure 9:
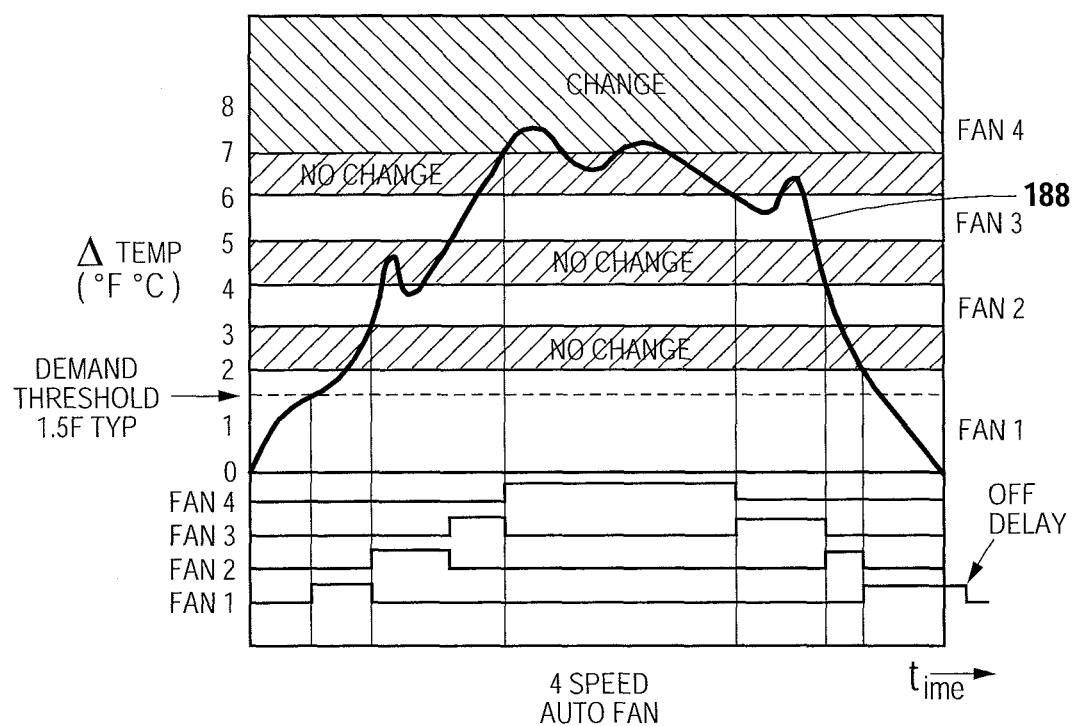
FIG. 9 is a pictorial schematic of possible changes in temperature before changes in fan speed if a 4-speed auto fan is used.

Assuming the temperature continues to rise to a third temperature differential (typically 5°) fan 2 will turn OFF and fan 3 will turn ON. If the temperature differential continues to rise to a higher temperature differential (typically 7° F.), fan 3 will turn OFF and fan 4 will turn ON to give the maximum fan speed. Thereafter, when the temperature differential is decreased, the set point to turn the fan OFF is typically a degree lower than it took to turn the fan ON providing hysteris. Therefore, there is a "NO CHANGE" zone between fan 4, fan 3, fan 2, and fan 1, as is illustrated in FIG. 9. When turning fan 1 OFF, there is a delay to ensure the temperature variation 188 is back to approximately 0. The "NO CHANGE" zone is necessary to ensure the fan does not oscillate or short cycle between two different speeds.

Figure 10:
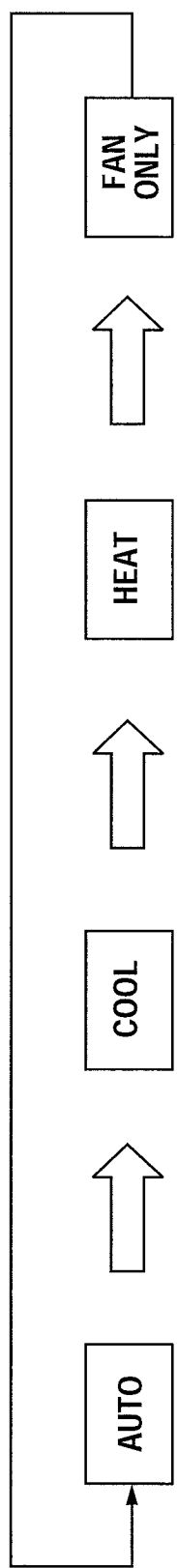
FIG. 10 shows a sequence of tables as the system progresses from AUTO to COOL to HEAT to FAN ONLY, given various operating parameters.

By pressing the system contact switch 140, the air conditioner/heat pump 58 and the electronic control system 74 can be progressed through AUTO, COOL, HEAT, and FAN ONLY, as is shown pictorially in FIG. 10. In the AUTO mode, the electronic control system 74 will store the appropriate information for the system, fan mode, fan speed, set point and schedule as is indicated in the Table A in FIG. 10. When the system has been changed to COOL, memory within the electronic control system 74 will be set for the system, fan mode, fan speed, set point and schedule as indicated in the Table B in FIG. 10. When the system is advanced in the HEAT mode, memory within the electronic control system 74 will be set for the system, fan mode, fan speed, set point and schedule as indicated in Table C of FIG. 10. Finally, when the system advances to FAN ONLY, memory in the electronic storage system 74 is stored in the system mode, fan mode, fan speed, and schedule as indicated in Table D of FIG. 10.

If the unit only has cooling, but no heating functions, the only system modes would be COOL or FAN ONLY and only respective Tables B or D in FIG. 10 would apply.

When the remote 80 of the electronic control system 74 as shown in FIG. 4 is used, it is important to keep the microcontroller 86 and the microcomputer 132 (see FIG. 5) synchronized. This is accomplished by the remote 80 sending all of the operating parameters indicated herein below whenever the user presses a button on the remote.

TABLE 1

| Operational Parameters |
| --- |
| Fan Speed |
| System |
| Cool Set Point-Temperature |
| Heat Set Point-Temperature |
| Auto Set Point-Temperature |
| ° F./° C. |
| Auto/Continuous {0,1 |
| Schedule On/Off |
| Power On/Off |
| Key Pressed |

This keeps the remote 80 along with the microcomputer 132 of the user interface 70 synchronized as well as the microcontroller 86 of the main board 76.

Figures 11, 12:
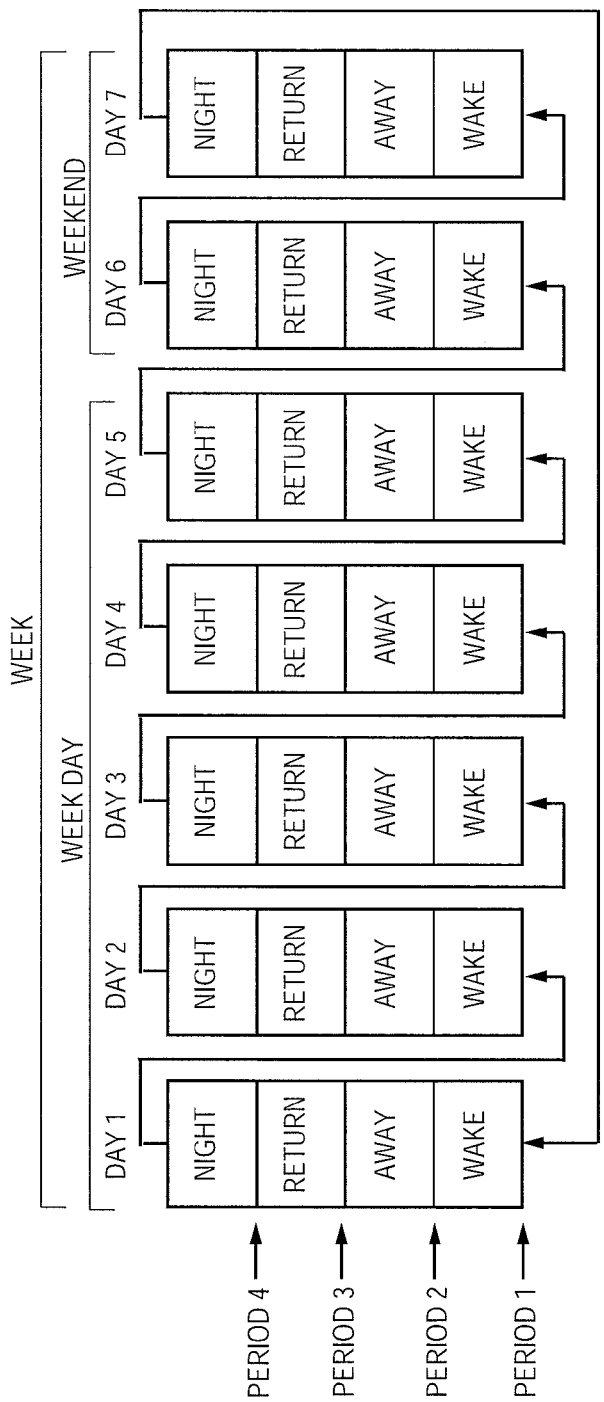
FIG. 11 gives the possible conditions that can be set on the scheduler for seven days a week, four periods per day, all of which can be different, the same, or any combination thereof.
FIG. 12 is an example of components/features that can be set electronically.

Referring to the schedule controlled by contact switch 146 and described in conjunction with FIG. 6, the electronic control system 74 provides a seven day flexible timer with up to four different intervals per day. The schedule periods are illustrated in FIG. 11 and can be programmed as previously described by the user interface 70. Any particular values desired for the NIGHT, RETURN, AWAY, or AWAKE periods can be set. For example, weekends or holidays might be programmed differently than weekdays where an individual goes to work. Each period for each day is independent or has a full compliment of control options including AUTO, HEAT, COOL, FAN ONLY, FAN SPEED, FAN MODE, OFF, SKIP and SET POINT.

The electronic control system 74 is designed to be a generic control platform that can be used for many types of room air conditioners and/or heat pumps with varying capacities or settings. The settings can be made via electronic control with internal switches indicating which components are available and which features to activate. An example of some configuration switches that are controlled electronically are shown in FIG. 12. This information may be loaded in through a personal computer 84 that connects to serial ports 190 shown in FIG. 4. Also, through the use of the serial port 190 and the personal computer 84, information can be retrieved such as history or current fault information. This can be used in determining if things need to be repaired or changed in the air conditioner/heat pump 58.

If a wall thermostat is connected through the wall thermostat connection 104 as shown in FIG. 4, the wall thermostat may have the following signals that can be used as represented in Table 2 herein below.

TABLE 2

| Signal | Use |
| --- | --- |
| W | Call for heating |
| B | Heat pump reversing valve |
| Y | Call for cooling (compressor) |
| GL | Low fan |
| GH | High Fan |

For example, the electronic control system 74 may incorporate an intelligent HVAC WallStat interface which may self correct potential wiring errors or damaged wiring. Without intelligent interface, the air conditioner/heat pump 58 might not operate if there are such potential errors. An example of such standard control signals are shown in Table 2.

As an example of intelligence in the WallStat Smart Logic, assume that cooling is desired and a Y signal is received. This would mean there should be a GL or GH signal also present. However, if no GL or GH signal is present, the electronic control system 74 will interpret the request as calling for cooling and run the compressor with the fan at high speed. A visible warning as to the problem will be given in the display 136.

If a W signal is called for heating, a GL or GH signal should also be present. If the W signal is received from the wall thermostat, but there is no GL or GH signal, it will interpret the W signal as calling for heat and will run the compressor in the heating mode with the fan at high speed. A visible warning will be given in the display 136. If an apparent error signal cannot be resolved, it will be flagged and possibly even shut down the air conditioner/heat pump.

Figure 13:
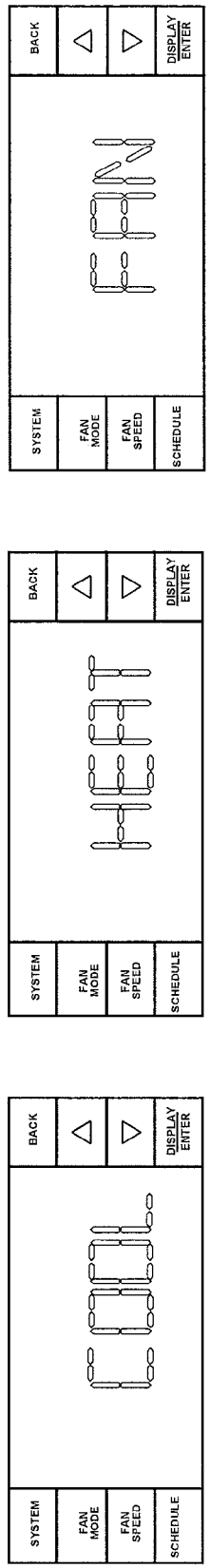
FIGS. 13A, B and C illustrates the temporary display that will be seen by the user when COOL, HEAT or FAN, respectively, are called for by the end user.

When using a wall thermostat user interface 70, display 136 will provide feedback as to whether COOL, HEAT or FAN is being requested as illustrated in FIGS. 13A, B, and C, respectively.

Figure 14:
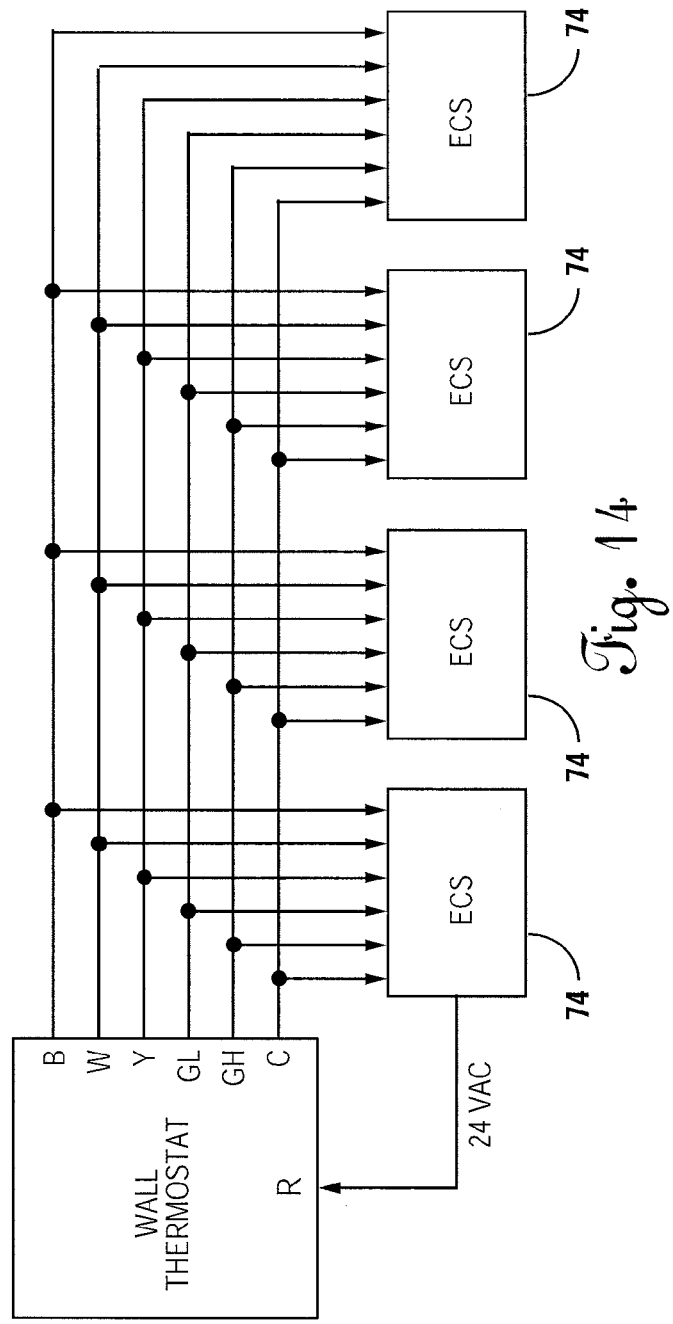
FIG. 14 is a schematic diagram of a wall thermostat controlling several electronic control systems for different room air conditioners and/or heat pumps.
Figure 15:
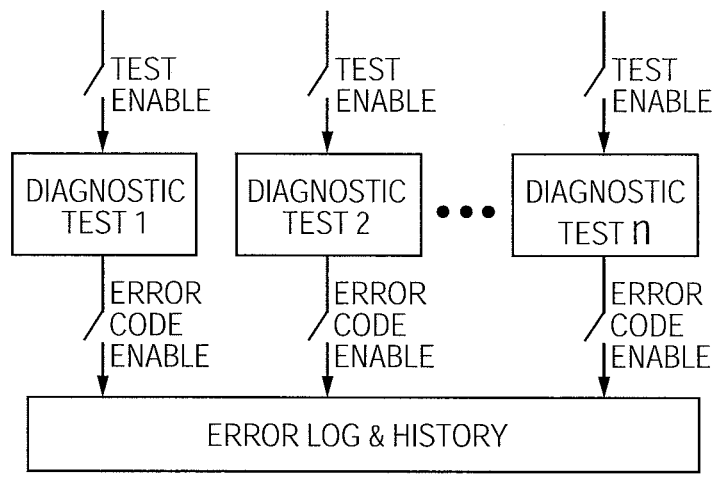
FIG. 15 is a schematic illustration of a multilevel fault system where a number of different diagnostic tests can be run with an error log and history.

Also, a group of air conditioners/heat pumps 58 may be grouped together for parallel connection to a common wall thermostat as shown in FIG. 14. Each of these separate air conditioner/heat pumps 58 will have its own electronic control system (ECS) 74 as shown. The electronic control system 74 also has a multilevel fault system, whereby individual faults are assigned severity once a problem has been detected by a diagnostic test and logged into a fault system. (See FIG. 15.) The severity of the fault can be escalated based upon the operational parameters and test conditions. The user is always presented with the most severe faults first. A fault history is also provided to find intermittent problems or faults.

If a fault is detected, the maintenance required icon 184, which resembles a wrench, will be shown on the display 136 (see FIG. 6). The wrench may be on solid or may be flashing (most severe condition). Some faults are logged for information purposes only, but do not trigger a maintenance required icon 184. The severity of the fault and what will result there from is indicated in Table 3 herein below.

TABLE 3

Severity Options

| Severity | Shut Down Unit | Flash Service Required | Service Required ON | Set Code | Log |
| --- | --- | --- | --- | --- | --- |
| 1 | ✓ | ✓ |  | ✓ | ✓ |
| 2 |  | ✓ |  | ✓ | ✓ |
| 3 |  |  | ✓ | ✓ | ✓ |
| 4 |  |  |  | ✓ | ✓ |

Once a fault has been cleared, the maintenance required icon 184 of the wrench is turned OFF, unless more faults still exist.

There are twenty diagnostic routines that run in the background to provide continuous protection. A listing of the diagnostic routines is shown in Table 4 herein below.

TABLE 4

Diagnostic Routines

| Test | Feature/Capability |
| --- | --- |
| 1 | Front panel switch is stuck |
| 2 | Input Voltage out of Specification |
| 3 | Ambient indoor temperature sensor is open or shorted |
| 4 | Indoor Coil temperature sensor is open or shorted |
| 5 | Outdoor Coil temperature sensor is open or shorted |
| 6 | Outdoor temperature sensor is open or shorted |
| 7 | Outdoor Coil > 175° F. |
| 8 | Indoor Coil temperature < 30° F. for 2 consecutive minutes |
| 9 | Unit cycles (hear or cool demand) > 9 times per hour |
| 10 | Unit cycles (hear or cool demand) < 3 times per hour |
| 11 | Room Freeze Protection |
| 12 | Wallstat Problem or Connection issue |
| 13 | Discharge Air > 185° F. |
| 14 | Pressure Limit Switch Open |
| 15 | Discharge Air temperature sensor is open or shorted |
| 16 | Heat Pump Error (RV Valve Fails) |
| 17 | Temperature Beyond Operating Limits |
| 18 | Minimum Configuration |
| 19 | Outdoor coil temperature sensor drops to 30° F. or less for 2 consecutive minutes |
| 20 | Frost Protection |

These diagnostic routines monitor the health of the air conditioner/heat pump 58 and continually check the operational environment. Each of these tests are independent and may be turned ON or OFF electronically.

Figure 16:
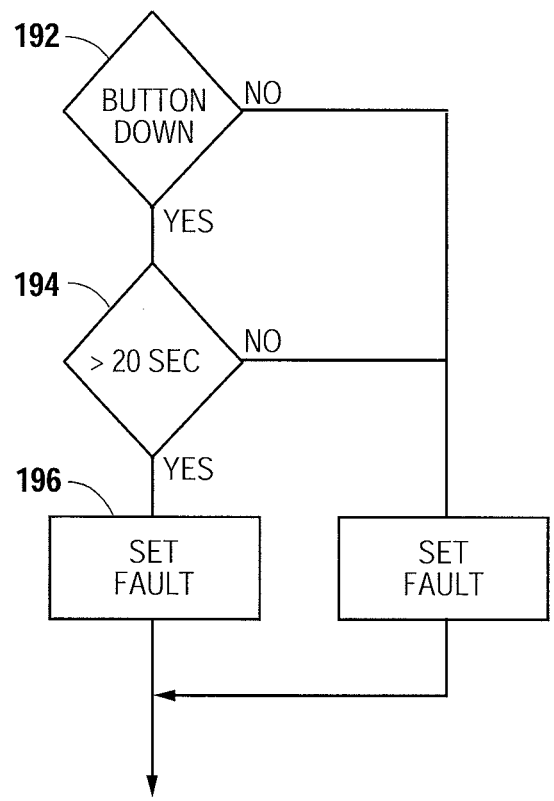
FIG. 16 is a functional block diagram of a diagnostic test to determine if the front panel switch is stuck.

As an example, Test 1 is shown in FIG. 16. To ensure that none of the contact switches 140-154 are not stuck, Test 1 is continually run. If a button down 192 is indicated, twenty seconds or greater will be waited and the test will be run again after a twenty-second delay 194. Thereafter, a set fault 196 will occur if a stuck contact switch 140-154 is detected. The set fault 196 is cleared once the contact switch 140-154 is no longer stuck.

Figure 17:
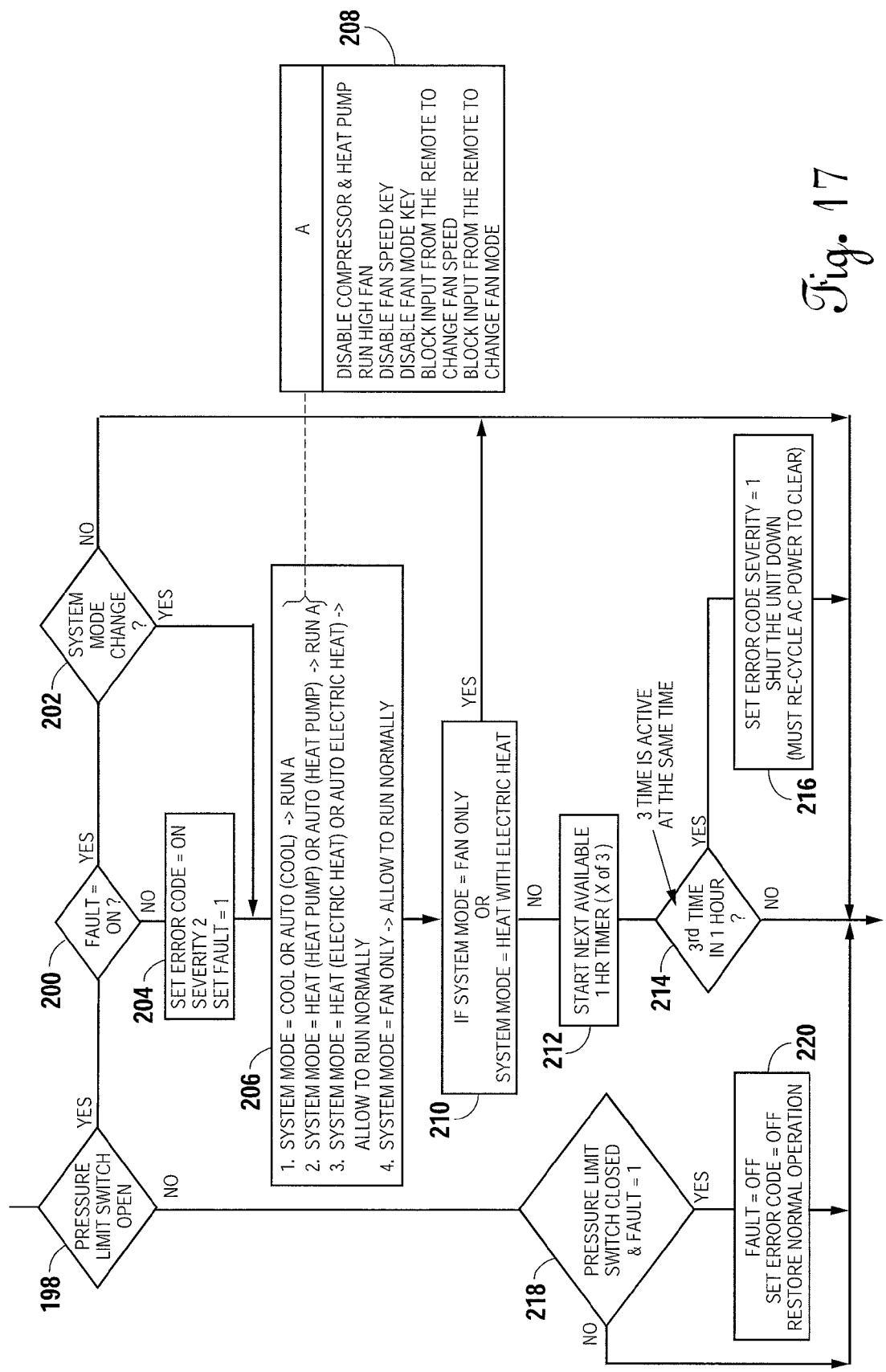
FIG. 17 is a functional block diagram of a diagnostic test to determine if the pressure limit switch is open.

As an example of a more complex diagnostic test, assume Test 14 for the pressure limit switch OPEN is run, as shown in FIG. 17. If a pressure limit switch 198 is open, this indicates the refrigerant pressures inside the system are excessive and the system must shut down. Assume the pressure limit switch OPEN 198 indicates "yes", then a determination is made for fault ON 200. If "yes", and there is not a system mode change 202, then a set error code 204 occurs. The action taken 206 due to the set error code 204 depends upon the condition under which the air conditioner/heat pump 58 is operating. An action table 208 gives a set of actions that could occur. Assuming the system can operate without the compressor, then alternative operations 210 are provided.

After the timer 212 times out (typically one hour), the system will check and see if the same condition exists. If this occurs three times, as determined by counter 214, the unit will shut down and severity code 1 will be indicated.

If there is a fault indication of the pressure limit switch CLOSED 218, once the fault is removed 220, normal operations are restored. The fault detection system as just described takes advantage of the multi-level fault system as previously described in conjunction with Table 3. The severity profile is initially set at 2 while the problem is attempting to be corrected. After the third attempt, the severity profile is changed to 1 which tells the system to shut down.

Any of the other twenty diagnostic tests can be run by the electronic control system 74. Tests 1 and 14 were given as typical examples of such diagnostic tests.

We claim:

1. An electronic control system for communicating with an end user of a room air conditioner and/or heat pump having a compressor, an accumulator, refrigerant/heating fluid, outdoor coil, indoor coil, reversing valve, cooling/heating capillary tube, a fan and a blower; said electronic control system comprising:
sensor inputs for determining (a) pressure of said refrigerant/heating fluid, (b) temperature of indoor air, (c) temperature of outdoor air, (d) temperature of said outdoor coil, (e) temperature of said indoor coil, (f) temperature of air on discharge side of said indoor coil and (g) humidity of indoor air;
outputs for controlling (a) said compressor, (b) said reversing valve, (c) said fan and (d) said blower;
between said sensor inputs and said outputs being located a main control and a user interface connected thereto, said main control including a microcontroller and said user interface including a microcomputer;
said microcontroller performing diagnostic testing to detect faults in said air conditioner/heat pump and, if a fault or faults are detected, provide a fault indication to an end user via said user interface;
said microcomputer recording a history of said fault or said faults;
said microcomputer of said user interface operates a display and control switches communicating to, and receiving communication from, said end user; said display is white on black using twisted nematic technology;
said microcontroller has control and processing algorithms therein to regulate said outputs, said microcontroller running diagnostic routines to monitor the health of said room air conditioner and/or heat pump and, if a health problem is detected, take corrective action based upon severity of said detected health problem; and
a heater coil so that if said outside coil begins to freeze up and needs to be reverse cycled, said outputs may also control said heater coil to provide heat during said reverse cycling.

2. The electronic control system for communicating with an end user of a room air conditioner/heat pump as recited in claim 1, wherein said microcontroller includes a scheduler for scheduling different temperatures at different times.

3. The electronic control system for communicating with an end user of a room air conditioner/heat pump as recited in claim 2, wherein said scheduler is for seven days a week with four different time periods per day.

4. The electronic control system for communicating with an end user of a room air conditioner/heat pump as recited in claim 1, wherein said microcomputer has remote access for diagnostics, testing, maintenance and/or upgrades.

5. The electronic control system for communicating with an end user of a room air conditioner/heat pump as recited in claim 4, wherein said user interface has an infrared port for receiving communications from a remote control in addition to said communications by said end user at said user interface.

6. The electronic control system for communicating with an end user of a room air conditioner/heat pump as recited in claim 5 further comprising drivers for receiving said outputs and operating said compressor, said reversing valve, said fan, said blower and said heater coil.

7. A method of operating an HVAC system by an end user for room temperature control, said method including the following steps:
sensing various conditions including (a) pressure of a refrigerant/heating fluid, (b) temperature of indoor air, (c) temperature of outdoor air, (d) temperature of an outdoor coil, (e) temperature of an indoor coil, (f) temperature of air on a discharge side of said indoor coil and (g) humidity of said indoor air;
continuously providing information from said sensing step into a microcontroller;
programming said microcontroller to process said information to send outputs for controlling (a) a compressor, (b) a reversing valve, (c) speed of a blower, (d) speed of a fan, and (e) a heater;
communicating with said end user conditions of said HVAC system via a user interface, said user interface using negative nematic field effect technology in said communicating step with said end user;
accepting changes in operating conditions from said end user via said user interface;
recording a history of said operating conditions in said microcontroller;
said programming step including running of diagnostic routines to monitor the health of said HVAC system and thereafter taking corrective action based upon severity of any detected health problems;
determining said severity of said detected health problem, said corrective action being preset based on severity of said detected health problems.

8. The method of operating said HVAC system by an end user for room temperature control as recited in claim 7, wherein said programming step includes in an event of power failure, maintaining in memory prior operating conditions so that when power is restored, said HVAC system can return to said prior operating conditions.

9. The method of operating said HVAC system by an end user for room temperature control as recited in claim 8, wherein said detected health problems are included in said communicating step with said end user, said corrective action in order of said severity of said health condition being detected can include (a) logging the event, (b) continuously indicate service required (c) flash service required or (d) shut down HVAC system.

10. The method of operating said HVAC system by an end user for room temperature control as recited in claim 9, wherein said programming step includes prioritizing of maintenance to be performed.

11. The method of operating said HVAC system by an end user for room temperature control as recited in claim 7, wherein said accepting changes step in said operating conditions include desires of said end user being made known in said communicating step via said user interface, said user interface providing for changes in (a) set indoor temperature, (b) variations between ON and OFF conditions (c) mode of operation, and (d) schedule of preselected operating conditions.

12. The method of operating said HVAC system by an end user for room temperature control as recited in claim 11, wherein said schedule is set by said end user and may be changed by said end user via said user interface.

13. The method of operating said HVAC system by an end user for room temperature control as recited in claim 7, wherein said HVAC system may be updated by remote access to said microcontroller, said programming step being rerun during said updates.

14. The method of operating said HVAC system by an end user for room temperature control as recited in claim 7, wherein said programming step being set to vary pulse width of said outputs.

* * * * *